(12) United States Patent
Stewart

(10) Patent No.: US 7,042,850 B2
(45) Date of Patent: May 9, 2006

(54) FOCUSED LINK STATE ADVERTISEMENTS

(75) Inventor: Mark A. W. Stewart, Acton, MA (US)

(73) Assignee: Fujitsu Limited, Kanagawa-ken (JP)

( * ) Notice: Subject to any disclaimer, the term of this patent is extended or adjusted under 35 U.S.C. 154(b) by 837 days.

(21) Appl. No.: 10/014,620

(22) Filed: Nov. 9, 2001

(65) Prior Publication Data

US 2003/0090996 A1 May 15, 2003

(51) Int. Cl.
*H04L 12/28* (2006.01)

(52) U.S. Cl. ...................... 370/254; 370/255; 370/242; 370/216

(58) Field of Classification Search ............... 370/254, 370/255, 351, 400, 401, 242, 216
See application file for complete search history.

(56) References Cited

U.S. PATENT DOCUMENTS

| | | | |
|---|---|---|---|
| 4,644,532 A | 2/1987 | George et al. ................. | 370/94 |
| 5,086,428 A | 2/1992 | Perlman et al. ............. | 370/94.1 |
| 5,117,422 A | 5/1992 | Hauptschein et al. ....... | 370/95.1 |
| 5,128,926 A | 7/1992 | Perlman et al. ............. | 370/54 |
| 5,687,168 A | 11/1997 | Iwata ........................... | 370/255 |
| 5,854,899 A | 12/1998 | Callon et al. ........... | 395/200.68 |
| 5,881,246 A | 3/1999 | Crawley et al. ......... | 395/200.68 |
| 5,933,425 A | 8/1999 | Iwata ........................... | 370/351 |
| 5,995,503 A | 11/1999 | Crawley et al. ............. | 370/351 |
| 6,016,306 A | 1/2000 | Le Boudec et al. ......... | 370/235 |
| 6,044,075 A | 3/2000 | Le Boudec et al. ......... | 370/351 |
| 6,252,856 B1 | 6/2001 | Zhang ......................... | 370/254 |
| 6,560,654 B1 * | 5/2003 | Fedyk et al. ................. | 709/239 |
| 6,614,785 B1 * | 9/2003 | Huai et al. ................... | 370/352 |
| 6,711,152 B1 * | 3/2004 | Kalmanek et al. .......... | 370/351 |
| 6,823,395 B1 * | 11/2004 | Adolfsson ................... | 709/242 |
| 6,856,627 B1 * | 2/2005 | Saleh et al. ................. | 370/397 |
| 6,876,625 B1 * | 4/2005 | McAllister et al. ......... | 370/221 |
| 2002/0141345 A1 * | 10/2002 | Szviatovszki et al. ...... | 370/238 |
| 2003/0026268 A1 * | 2/2003 | Nevas ......................... | 370/400 |

OTHER PUBLICATIONS

Beniluz et al., "OSPF—Open Shortest Path First", http://www.raw.com/networds/1995/ospf/ospf.html, pp. 1-16, 1995.

* cited by examiner

*Primary Examiner*—Ricky Q. Ngo
*Assistant Examiner*—Nguyen H. Ngo
(74) *Attorney, Agent, or Firm*—Weingarten, Schurgin, Gagnebin & Lebovici LLP

(57) ABSTRACT

A network router generates node state advertisements identifying network links about which the router node desires to receive link state information. The node state advertisements are flooded to other routers, each of which determines whether it lies along the shortest path between the link and the originating router. Each router that lies along the shortest path maintains an association between the link and the originating router, the association indicating that link state advertisements concerning the link are to be forwarded along the path toward the originating router. Upon a change of the state of the link, each router forwards a corresponding link state advertisement to an adjacent node along the path, whereby the originating router ultimately receives the link-state advertisement.

9 Claims, 2 Drawing Sheets

FOCUSED LINK STATE ADVERTISEMENTS

CROSS REFERENCE TO RELATED APPLICATIONS

-None-

STATEMENT REGARDING FEDERALLY SPONSORED RESEARCH OR DEVELOPMENT

-Not Applicable-

BACKGROUND OF THE INVENTION

The present invention is related to the field of link-state network routing protocols such as the Open Shortest Path First (OSPF) routing protocol.

In the operation of link-state routing protocols, network routers maintain independent copies of a link-state database and use the stored link-state information to conduct message routing operations. The routers communicate link-state advertisements among themselves to make sure that all routers are apprised of changes to links in the network, so that routing decisions are generally made on up-to-date information concerning the current network topology and the performance characteristics of the various network links. A link-state advertisement generated by a given router is generally broadcast, or "flooded", to all the other routers in an area, and each router uses the information in each advertisement to make corresponding changes in its link-state database.

Currently, OSPF routers generate link-state advertisements in two ways. First, there is a periodic broadcast of all the entries in a router's link-state database. This operation can be useful to initialize other routers and to replace outdated entries in the databases of other routers. Additionally, routers originate link-state advertisements in a change-driven manner. That is, a router for a given link monitors certain operating parameters of the link and generates a link-state advertisement when any of the parameters changes. For example, it is common for routers to monitor changes in the unreserved bandwidth of a link. This monitoring can be used in conjunction with thresholds to give a measure of control over how often link-state advertisements are generated. For example, a router can monitor for a change of a specified amount, such as 10%, in unreserved bandwidth since the last link-state advertisement was generated for the link, and generate a new link-state advertisement only when that condition is satisfied.

The flooding of link-state advertisements can result in operating inefficiency in the network. On the one hand, it is important that changes be propagated throughout the network promptly, so that good routing decisions can be made. However, the transmission and processing of link-state advertisements consumes network resources that might be better spent processing data messages. As the volume of link-state advertisements grows, the efficiency of network operation diminishes. While techniques such as the use of thresholds can be used to reduce link-state advertisement traffic to some extent, there is still substantial room for improvement in the operating efficiency of link-state routing protocols.

BRIEF SUMMARY OF THE INVENTION

In accordance with the present invention, a method of propagating link state information in a network is disclosed. The information is propagated in a more targeted fashion than in prior art link-state protocols, resulting in more efficient network performance.

In the disclosed method, a router generates node state advertisements, each identifying the router and a network link about which the router desires to receive link state information. The node state advertisements are flooded to all the routers in a routing area. Each router receiving a given node state advertisement determines whether it lies along a path meeting a predetermined criteria between the link and the router identified in the node state advertisement. One significant criteria that can be employed is whether the router lies along the shortest path between the link and the identified router.

Each router that lies along such a path maintains an association between the link and the router identified in the node state advertisement, the association indicating that link state advertisements concerning the identified link are to be forwarded along the path toward the identified router. Upon a change of the state of the identified link, the router node forwards a corresponding link state advertisement to an adjacent node along the path toward the identified router. Through the repetition of this process at all routers along the path, link-state advertisements are carried directly to routers that have explicitly expressed interest in receiving them. While it may be preferable to continue to broadcast link-state advertisements to ensure that all routers eventually receive complete information, the disclosed technique can be used to ensure that certain routers receive up-to-date information in an expeditious fashion to enhance network performance.

The disclosed method can be used in conjunction with protection switching. An ingress node for a primary path generates node state advertisements identifying a link of the primary path so that it will be promptly notified of a failure of the link. Upon such notification, the ingress node can promptly initiate protection switching. The link failure information is communicated to the ingress node efficiently along the previously-established signaling path.

Other aspects, features, and advantages of the present invention will be apparent from in the detailed description that follows.

BRIEF DESCRIPTION OF THE SEVERAL VIEWS OF THE DRAWING

The invention will be more fully understood by reference to the following Detailed Description of the invention in conjunction with the Drawing, of which.

DETAILED DESCRIPTION OF THE INVENTION

Figure 1:
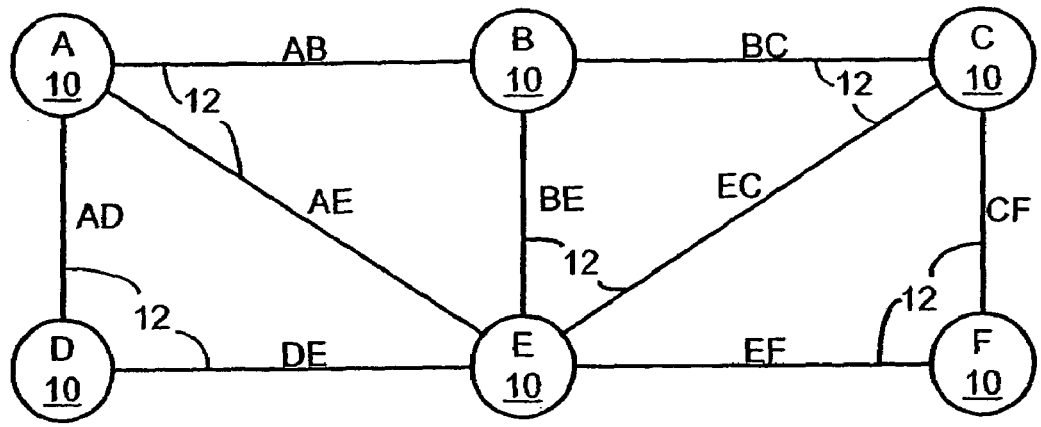
FIG. 1 is a block diagram of a routing area of a network in accordance with the present invention.

FIG. 1 shows a simplified example network including routers 10 interconnected by links 12. The routers 10 are labeled A, B, C, D, E and F, and the links 12 are labeled to reflect the connected routers. That is, link AB connects routers A and B, link AE connects routers A and E, etc. In general, the links 12 can be LAN segments, point-to-point links, or any other collection of layer-2 network components. For the sake of clarity, the connections of host computers and other devices have been omitted from FIG. 1.

For ease of description, it is assumed that all the links 12 have equal metrics from a routing perspective. In such a case, the "cost" of a given route between two nodes is equivalent to the number of "hops", or different links 12 along the route. It will be clear to those skilled in the art that the disclosed techniques are more generally applicable to the case in which different links 12 have different metrics. Additionally, this disclosure focuses on the "shortest" path as the best path for forwarding certain messages, as described in more detail below. However, in alternative embodiments, there may be other criteria used for determining the best path, such as reliability, congestion avoidance, cost, speed, or other criteria that can be pertinent from a message routing perspective.

In link-state routing protocols, such as the Open Shortest Path First (OSPF) routing protocol, a certain router 10 on each link 12 assumes the status of "Designated Router" or DR for the link. The primary responsibility of a DR is to broadcast link state advertisements on behalf of the link. As is known in the art, these link state advertisements are received by the other routers in a routing area, and are used by each router to maintain a local link-state database used in routing operations. In the simplified network of FIG. 1, it is assumed that DRs for the links 12 are as shown in Table 1 below.

TABLE 1

| Link | DR |
|------|-----|
| AB | A |
| AE | A |
| AD | A |
| DE | D |
| BE | B |
| BC | B |
| EC | C |
| EF | F |
| CF | F |

In the operation of conventional link-state routing protocols such as OSPF, link-state messages are generated by DRs and "flooded" throughout a routing area. Each router receiving a link-state message forwards the message to any adjacent routers that might not have received the message. This flooding can be wasteful of network communications bandwidth. Generally, many of the transmissions may be redundant, because the recipient has already received the message via another router. Additionally, information concerning a given link may be much more pertinent to some routers in the area than to other routers. Routers handling a significant amount of traffic that traverses a given link generally benefit from having up-to-date information about the link, whereas the operation of other routers may not suffer notably if their information about the link is not current.

Figure 2:
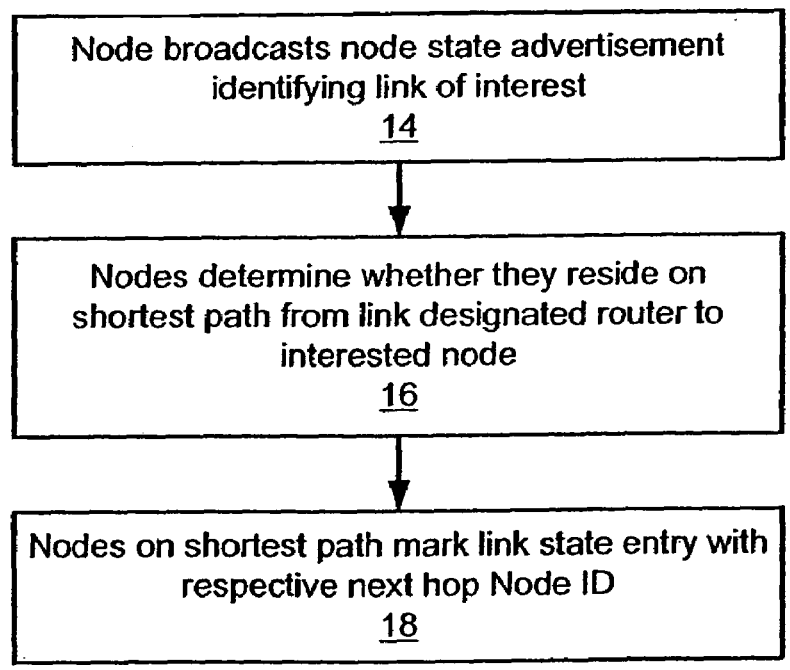
FIG. 2 is a flow diagram of a process for generating and registering node state information in routers in the network of FIG. 1.

FIG. 2 shows a process that enables link-state advertisements to be made in a more targeted or focused manner. The process assumes that certain routers can identify themselves as being particularly interested in the link-state information of certain links in the network. This knowledge is exploited to create multicast trees for sending targeted link-state advertisements from the DRs for those links to the various interested routers. A router may express such interest for any of a variety of purposes. For example, edge routers participating in a source routing scheme may be interested in the state of all links lying along paths to any of a number of destination nodes in an area. Alternatively, certain routers may be associated with a higher level of service offered to network customers at a premium price; such routers could offer generally better performance by virtue of having superior routing-pertinent information.

Referring to FIG. 2, in step 14 a router broadcasts a node state advertisement, and this message is flooded throughout a routing area in a manner analogous to the flooding of link-state advertisements in conventional link-state protocols. The node state advertisement identifies the originating router and further identifies one or more links about which the router wishes to receive link-state advertisements.

At step 16, each router that receives a node state advertisement determines whether it resides along the shortest path to the originating router from the DR for any of the identified links. It will be appreciated that this is the same type of calculation that is commonly carried out in OSPF routers for normal routing operations.

At step 18, a node that determines that it lies along the shortest path between a router and a link identified in a node state advertisement marks the entry for the link in its link state database with an identifier of the next router along the shortest path (shown in FIG. 2 as "next hop node ID"). This piece of information tells the router that upon any change to the link state entry, a corresponding link-state advertisement should be forwarded to the identified next hop router. Because this process is repeated at each router along the shortest path, it results in a chain of such identifiers in successive routers that collectively operate to forward link-state advertisements regarding the identified link toward the router that originated the node state advertisement.

Figure 3:
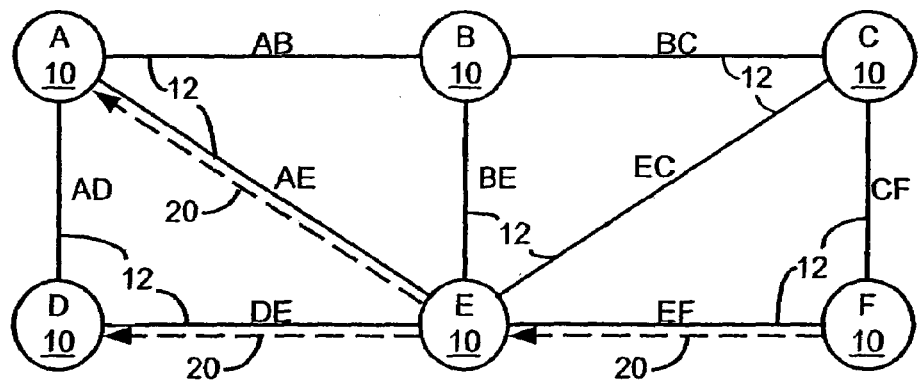
FIG. 3 is a block diagram depicting a multicast tree in the network of FIG. 1 resulting from the process of FIG. 2.

FIG. 3 illustrates an example of the above process. It is assumed that routers A and D have generated node state advertisements expressing interest in link CF, for which node F is the DR. These messages are broadcast to all the routers 10. Upon receiving these messages, routers E and F determine that they lie along the shortest path from router F to each of routers A and D. Router F responds by associating an identifier of router E (the next-hop router) with its link-state entry for link CF. Router E responds by associating identifiers of routers A and D with its link-state entry for link CF. The result, as shown, is a logical multicast tree having branches 20 along F->E->(A,D).

Figure 4:
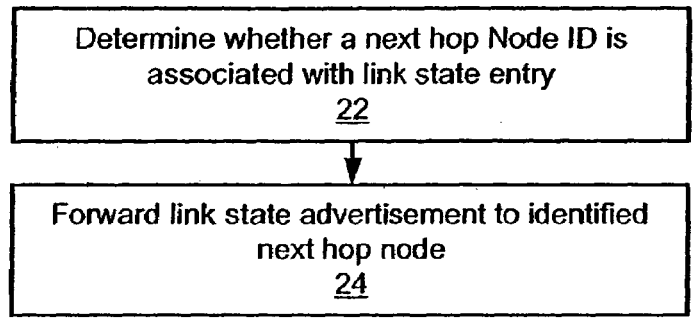
FIG. 4 is a flow diagram of a process for forwarding link state advertisements along the multicast tree of FIG. 3.

FIG. 4 shows the operation at each router 10 upon receiving a link-state advertisement. At step 22, the router determines whether there is a next hop node ID associated with the link-state entry for the link identified in the advertisement. If so, then at step 24 the link-state advertisement is forwarded to the identified next hop node. In the above example, the receipt of a link-state advertisement regarding link CF at router F results in the forwarding of the link-state advertisement to router E, which in turn results in the forwarding of the link-state advertisement from router E to routers A and D. Thus, there may be more than one next hop node associated with a given link-state entry, in which case the link-state advertisement is forwarded to all identified nodes.

Figure 5:
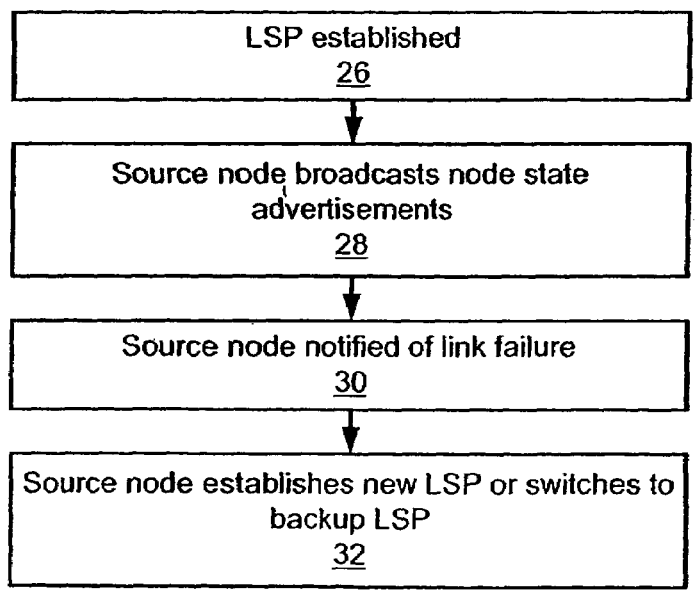
FIG. 5 is a flow diagram of a protection switching process in accordance with the present invention utilizing processes like the processes of FIGS. 2 and 4.

FIG. 5 shows an application of the disclosed link-state advertisement technique to a network employing protected label-switched paths (LSPs). As is known in the art, the source or "ingress" node of an LSP in a network plays a significant role in establishing and utilizing the LSP. The disclosed link-state advertisement technique enables a source node of an LSP to quickly become aware of failures that require some type of protection action.

In step 26 of FIG. 5, an LSP between a source and destination in a label-switched network is established. This LSP is referred to below as the primary LSP. Depending on the specific protection scheme utilized, a backup LSP may also be established at the same time.

In step 28, the source node broadcasts node state advertisement(s) indicating that it is interested in receiving link-state advertisements concerning some or all of the links that make up the primary LSP. In response, the nodes receiving this message carry out the steps of FIG. 2 above, and thereby one or more multicast trees are established as signaling paths for future communication of link-state advertisements.

In step 30, the source node receives a link-state advertisement indicating that the corresponding link has become unavailable. This may take the form, for example, of a "link down" status. This message is the result of a set of forwarding actions taken by the nodes along the signaling path, as described above with reference to FIGS. 3 and 4.

In step 32, the source node responds to the notification by taking the appropriate protection action, which generally involves switching the traffic from the primary LSP to a backup LSP. If the backup LSP has not already been established, then it can be established at this time. Once such action has been taken, the source node may send additional node-state advertisements regarding the links lying along the new LSP.

It will be apparent to those skilled in the art that modifications to and variations of the above-described technique are possible without departing from the inventive concepts disclosed herein. Accordingly, the invention should not be viewed as limited except by the scope and spirit of the appended claims.

What is claimed is:

1. A method of propagating link state information in a routing area of a network including a plurality of routers, comprising:

generating a node state advertisement at a first router of the plurality of routers, the node state advertisement identifying the first router and a link about which the first router desires to receive link state information;

flooding the node state advertisement throughout the routing area so as to ensure that substantially all of the plurality of routers receive the node state advertisement;

at each of the routers receiving the node state advertisement, determining whether the receiving router lies along a path meeting a predetermined criteria between the link and the first router; and at each of at least one second router determined to lie along such a path, (1) maintaining an association between the link and the first router, the association indicating that link state advertisements concerning the link are to be forwarded along the path toward the first router, and (2) upon a change of the state of the link, forwarding a corresponding link state advertisement to an adjacent one of the routers along the path toward the first router.

2. A method according to claim 1, wherein the predetermined criteria is that the path be the shortest path between the link and the first router.

3. A method according to claim 1, wherein maintaining the association between the link and the first router comprises storing a next hop node identifier with a link state entry for the link, the next hop node identifier identifying the adjacent one of the routers.

4. A method according to claim 1, wherein the change of the state of the link comprises a change in unreserved bandwidth of the link.

5. A method according to claim 1, wherein the change of the state of the link comprises a change in latency of the link.

6. A method according to claim 1, wherein the change of the state of the link comprises failure of the link.

7. A method of performing protection switching in a network, comprising:

broadcasting a node state advertisement from an ingress node of a primary communications path in the network, the node state advertisement identifying the ingress node and a link included in the primary communications path, the ingress node transmitting ingress data traffic on the primary communications path in the absence of a failure thereon;

flooding the node state advertisement throughout a routing area of the network so as to ensure that substantially all of a plurality of routers in the routing area receives the node state advertisement;

at each of the routers receiving the node state advertisement, determining whether the receiving router lies along a desired signaling path between the ingress node and the link;

at each of the routers determined to lie along the desired signaling path, (1) maintaining an association between the link and the ingress node, the association indicating that link state advertisements concerning the link are to be forwarded along the desired signaling path toward the ingress node, and (2) upon a change of the state of the link, forwarding a corresponding link state advertisement to an adjacent one of the routers along the desired signaling path toward the ingress node;

at a designated router for the identified link, upon a failure of the link, originating a link-state advertisement indicating that the link has failed, and forwarding the link-state advertisement to an adjacent one of the routers along the desired signaling path toward the ingress node; and at the ingress node, upon receipt of the link-state advertisement indicating that the link has failed, switching the ingress data traffic from the primary communications path to a backup communications path.

8. A method according to claim 7, wherein the desired signaling path is the shortest path between the link and the ingress node.

9. A method according to claim 7, wherein maintaining the association between the link and the ingress node comprises storing a next hop node identifier with a link state entry for the link, the next hop node identifier identifying the adjacent one of the routers.

* * * * *